Fig. 3

United States Patent Office 3,176,287
Patented Mar. 30, 1965

3,176,287
DATA HANDLING SYSTEM
Charles R. Fisher, Jr., Pittsford, N.Y., assignor to General Dynamics Corporation, Rochester, N.Y., a corporation of Delaware
Original application Jan. 18, 1957, Ser. No. 634,973, now Patent No. 2,976,347, dated Mar. 21, 1961. Divided and this application July 28, 1960, Ser. No. 45,906
17 Claims. (Cl. 340—345)

This invention relates to a data handling system and, more particularly, to new and improved means for reproducing and transmitting coded signals. This application is a division of a copending application of Charles R. Fisher et al., Serial No. 634,973, filed January 18, 1957, now Patent No. 2,976,347, issued March 21, 1961.

In existing data handling systems of the type used in a telegraph network, lengths of a record medium, such as paper tape, are used in reperforating equipment to provide intermediate data storage at switching points or between data originating and terminating offices. The use of an expandable storage medium, such as a perforated tape, is somewhat costly from the viewpoints of material cost and handling time and usually requires the provision of an essentially mechanical mechanism, such as a perforator. Because of the high operating speeds utilized, these mechanical components require precision construction, are difficult to maintain without skilled personnel, and involve a rather large capital expenditure. In addition, it often is not possible to fully realize either the high speed operation or the reduction of installation space afforded by electronic techniques when mechanical links are interposed in the system.

Accordingly, one object of the present invention is to provide a new and improved data handling system.

Another object is to provide a data handling system including a reuseable storage medium.

A further object is the provision of a system of the type described above having new and improved data transmitting means.

Another object is to provide an improved commutator or distributor construction.

Another object is to provide means controlled by stored and coded data entries for transmitting signals representing the stored data entries.

A further object is to provide a data handling system including means for storing a coded entry and means controlled by the storing means for transmitting certain stored entries and for decoding and transmitting other stored entries.

Another object is to provide a transmitting commutator including a mark signal channel and a space signal channel and means including a plurality of gating means controlled by a stored coded entry for transmitting signals over said mark and space signal channels corresponding to the stored entry.

Another object is to provide a transmitting commutator including new and improved means for concurrently reproducing the bits of a coded entry from a record and for sequentially transmitting signals corresponding to the concurrently reproduced bits of the entry.

Another object is to provide a transmitting commutator in which a plurality of bistable bit storage units control both switching means for extending a connection to a data receiver and means for transmitting signals corresponding to a data entry stored in the bit storage units.

A further object is to provide a transmitting commutator in which a plurality of bistable bit storage units for storing a coded data entry control a gating network that both decodes stored entries and transmits signals representing stored entries.

In accordance with these and many other objects, an embodiment of the invention comprises a data handling system including transmitting means for supplying groups of serially transmitted signals representing coded data entries, such as those provided in Baudot code. A receiving commutator controlled by the serially transmitted signals operates a recorder to store each coded data entry in parallel form on a magnetic member, such as an endless length of magnetic film or tape.

The parallel data entries stored on the magnetic film are reproduced by a transmitter spaced from the recorder, and the reproduced signals are forwarded from the transmitter to a transmitting commutator in which the concurrently reproduced bits of the coded parallel data entry are stored in a corresponding number of bistable bit storage units. The transmitting commutator includes a first gating network controlled by the bistable storage units for recognizing certain data entries that are to be forwarded from the transmitting commutator to a marker control and register decoder. These data entries are decoded in this unit and suppled to switching equipment that extends a signaling path from the transmitting commutator to a selected data receiver. When the signaling path has been established, the parallel entries subsequently transferred from the transmitter to the transmitting commutator are stored in the bistable bit storage units as parallel entries. These entries are then converted into corresponding groups of serially transmitted coded signals under the control of a second gating arrangement which is controlled by the bistable bit storage units and which is driven by a counting circuit.

Many other objects and advantages of the present invention will become apparent from considering the following detailed description in conjunction with the drawings in which:

FIG. 1 is a block diagram of a data handling and transmitting system embodying the present invention;

FIGS. 2–4 are a schematic circuit diagram of a transmitting commutator included in the system shown in FIG. 1; and FIG. 5 is a block diagram indicating the manner in which FIGS. 2–4 are positioned adjacent each other to form a complete circuit diagram of the transmitting commutator. For convenience, each of the conductors interconnecting the various figures has been given an individual reference numeral which appears on each figure on which that individual conductor appears.

Figures 1, 2:
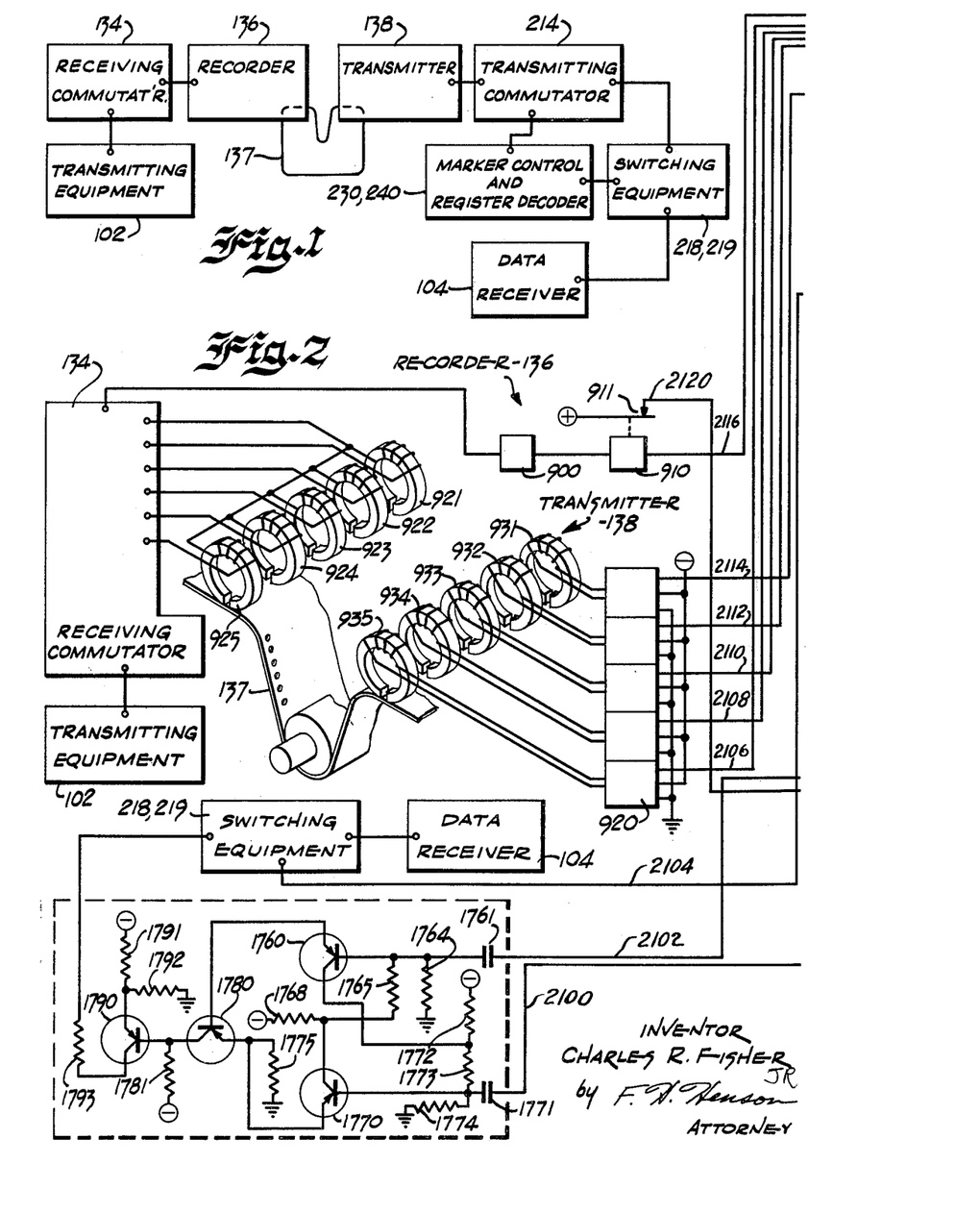

Referring now more specifically to FIG. 1 of the drawings, therein is shown a data handling system, indicated generally as 100, which embodies the present invention and which can comprise a telegraph switching system of the type described in detail in the above identified Fisher et al. application. To illustrate the relationship between the circuits in the present application and the Fisher et al. application, the same reference numbers have been used in both applications wherever possible. In general, the system 100 includes transmitting equipment 102 at a local or remote point for transmitting successive Baudot code combinations over a signaling line to a receiving commutator 134. The receiving commutator controls a recorder 136 to record the serially received code combinations as parallel entries on an endless loop of magnetic film or tape 137. The recorder 136 includes five transducing or recording heads corresponding to the five information or mark and space bits in the Baudot code, and these five heads are disposed adjacent five transversely spaced portions of the magnetic film 137 to define five longitudinally extending channels. The receiving commutator 134 controls the recorder 136 to record a received data entry as an aligned permutation of magnetized or nonmagnetized conditions on the five channels of the film 137.

When the data stored on the magnetic film 137 is to be reproduced, a transmitter 138 is placed in operation to advance the magnetic film 137 step-by-step. As each code combination or data entry is advanced past five reproducing or transducing heads disposed adjacent the five channels of the film, the transmitter 138 concurrently reproduces the bits of the recorded code combination and transmits these bits to a transmitting commutator 214 in which each of the bits is stored in one of five bistable bit storage units. The transmitting commutator includes means for detecting certain coded entries and for forwarding these entries to a marker control and register decoder 230, 240 in which the data entry is translated into control signals for selectively operating switching equipment 218, 219 to extend an output signaling path from the transmitting commutator 214 to a data receiver 104. When the signaling path has been completed, the transmitting commutator 214 is controlled by the transmitter 138 to transmit subsequently reproduced data entries through the switching equipment to the data receiver in the form of a series of groups of mark and space pulses representing the information previously stored on the magnetic film 137 by the recorder 136.

The five binary storage units provided in the transmitting commutator 214 comprises five pairs of controlled conduction devices connected to have two alternate stable conductive states. To provide means for decoding certain ones of the coded data entries stored in the bit storage units, the output electrodes of the controlled conduction devices in the bit storage units are connected to a first gating matrix comprising a plurality of neon diodes connected between a pulse source and a number of detecting means. If a predetermined coded combination is stored in the bit storage units, a read pulse applied to the input of the series connected neon diodes is transmitted over a given path through these diodes to one of the detecting means to provide an indication that a particular entry has been stored. If the coded entry is one, for instance, that indicates that the following entries are switching codes, the following entries stored in the bistable circuits are forwarded to the marker control and register decoder 230, 240 in which they are decoded to provide signals for operating the switching equipment 218, 219.

To control the transmission of the parallel coded entries stored in the bit storage units, the transmitting commutator 214 includes a mark signal channel and a space signal channel which are connected by pairs of neon diode gates to a counting chain driven by a multivibrator. These pairs of neon diode gates are connected to corresponding ones of the bit storage units and are selectively enabled by the conductive patterns existing therein. When the counting circuit is placed in operation, each of the pairs of gates is pulsed, and the enabled one of each pair of these gates transmits the applied pulse over the mark or space signaling channel to a bistable or flip-flop output circuit. This bistable circuit, which is connected to the output signaling line or channel, is operated between alternate mark and space conditions in accordance with the permutation of signals supplied on the mark and space channels and controls the application of a corresponding pattern of voltages to the output signaling line.

The recorder 136 and the transmitter 138 (FIG. 2) can comprise any suitable magnetic data storing apparatus, such as those utilizing a magnetic drum or tape as a record element. However, the recorder 136 and the transmitter 138 preferably include an apparatus of the type shown and described in detail in the above identified Fisher et al. application. As illustrated therein, the magnetic member 137 comprises an endless length or closed loop of a flexible magnetic film having a longitudinally extending row of sprocket holes adjacent each of its edges. To record the five information bits or mark and space signals forming each Baudot code combination, the recorder 136 incldes five magnetic transducing or recording heads 921–925 that are disposed adjacent transversely spaced portions of the magnetic member 137 to define separate data receiving channels. Although the tranducing heads 921–925 are shown in transversely aligned positions, these heads can be disposed in any suitable staggered arrangement. The recorder 136 also includes a drive mechanism for advancing the magnetic member 137 through a given increment of movement following each recording operation. As described in the above identified Fisher et al. application, this drive mechanism can comprise a sprocket wheel which engages the holes in the edges of the magnetic film 137 and which is operated by the release of a solenoid 900.

When information to be recorded is received by the receiving commutator 134 from the transmitting equipment 102, a counting circuit in the receiving commutator 134 sequentially renders each of the heads 921–925 responsive to the potential existing on a common signaling conductor. The circuits in the receiving commutator 134 are such that the winding of the head 921 is energized to magnetize the portion of the magnetic film 137 disposed below its gap if the first received information bit is a mark pulse. The winding of the head 921 is not energized if the first information bit is a space pulse. The remaining heads 922–925 are energized in sequence so that the head 925 records the mark or space signal forming the last information bit in the Baudot code combination. Accordingly, the magnetic film 137 is provided with successive parallel patterns of magnetized and nonmagnetized incremental areas corresponding to successive Baudot coded entries in which a magnetized area represents a recorded mark signal.

The transmitter 138 includes five reproducing or magnetic transducing heads 931–935 disposed adjacent the five transversely spaced and longitudinally extending channels in which data is recorded by the transducing heads 921–925. The transducing heads 931–935 are connected to the input of a five channel amplifying means 920, the output of which is connected to the five bit storage units in the transmitting commutator 214. To provide means for advancing the magnetic member 137 past the heads 931–935, the transmitter 138 includes a drive mechanism of the type shown in detail in the above identified Fisher et al. application. This drive mechanism includes a sprocket wheel which engages the sprocket holes in the magnetic member 137 and which is driven by the release of a solenoid 910. The drive mechanism in the transmitter 138 is so positioned relative to the transducing heads 931–935 and 921–925 that the signals recorded on the magnetic member 137 by the heads 921–925 are moved or swept past the gaps in the heads 931–935 when the drive means is operated. The existence of a magnetized area representing a recorded mark signal induces a voltage in the windings of the heads 931–935, and these induced voltages appear at the outputs of the amplifying means 920 as positive-going pulses.

The operation of the transmitter 138 and the transmitting commutator 214 to retransmit the information stored on the magnetic film 137 by the recorder 136 is initiated under the control of contacts that are actuated to opened or closed conditions in accordance with the length of the supply loop of film disposed between the recording heads 921–925 and the reproducing heads 931–935. When an adequate supply loop of film 137 having data stored thereon is provided between the recorder 136 and the transmitter 138, an operating circuit is completed for a start relay 1500 in the transmitting commutator 214. The operation of the start relay 1500 closes a pair of contacts 1501 to connect B+ potential across a voltage divider connected to the control electrode of a start pulse tube 1510 in a counting chain including a plurality of other gaseous discharge tubes 1511, 1512, 1513, 1514 and 1515, representing the five bits of the Baudot code, and a stop tube 1516. These tubes are connected to form a seven element counting chain. The control electrodes of these tubes are capacitively coupled to the output of a continuously operative multivibrator 1400. Accordingly, following the closure of the contacts 1501 to provide an enabling bias for the tube 1510, the first pulse supplied by the multivibraotr 1400 is coupled through a condenser 1506 to fire the tube 1510. Firing this tube provides a potential drop in its cathode circuit to supply an enabling bias for the second tube 1511 in the counting chain. In a similar manner, the pulses applied by the multivibrator 1400 to the counting chain including the tubes 1510–1516 sequentially renders each of these tubes conductive.

Since the data stored on the magnetic film 137 by the heads 921–925 is spaced from the reproducing heads 931–935, the magnetic film 137 must be advanced before combinational code data can be reproduced and transmitted to the transmitting commutator 214. Accordingly, a transistorized drive circuit for the motor magnet or solenoid 910 in the transmitter 138 is provided which is controlled by the stop tube 1516 in the transmitting commutator 214. More specifically, the base electrode of a transistor 1620 is normally connected to negative battery through a portion of the cathode resistance of the stop tube 1516 to maintain the base elecrode negative with respect to the grounded emitter of the transistor 1620, thereby holding this transistor in a conductive condition. However, when the tube 1516 is fired under the control of the multivibrator 1400 and the preceding tube 1515 in the counting chain, a positive voltage drop is produced across the cathode resistance of the tube 1516 to render the base electrode of the transistor 1620 positive with respect to its emitter so that this transistor is cut off. The termination of collector current flow through the transistor 1620 and a ballast lamp 1622 applies a more negative bias to the base electrode of a transistor 1621, the emitter electrode of which is supplied with a fixed negative bias. The magnitude of the negative potential supplied to the base electrode of the transistor 1621 is greater than that applied to the emitter electrode so that the transistor 1621 now conducts to provide a current flow through the operating winding of the motor magnet 910. The energization of the motor magnet 910 opens a pair of interrupter contacs 911 so that B+ is removed from the counting tubes 1510–1516, thereby extinguishing these tubes. Extinguishing the tube 1516 returns the base electrode of the transistor 1620 to a negative potential so that the transistor 1620 begins to conduct and conduction in the transistor 1621 is terminated to release the motor magnet 910. The release of the motor magnet 910 closes the contacts 911 to again apply B+ potential to the gaseous discharge tubes in the transmitting commutator 214 and also releases the step drive mechanism so that the magnetic tape 137 is advanced a single step relative to the reproducing heads 931–935.

This intermittent operation continues until such time as the first item of information recorded on the magnetic film 137 has been advanced to a position adjacent the transducing heads 931–935. The counting chain then advances through another cycle of operation in which the motor magnet 910 is momentarily energized and released to sweep the first recorded code combination past the transducing heads 931–935 so that the amplifier 920 selectively transmits positive impulses to the transmitting commutator 214 in accordance with those of the five channels on the magnetic film 137 in which mark pulse information has been recorded. This information is stored in five bistable circuits or bit storage units in the transmitting commutator 214.

More specifically, the transducing heads 931–935 control the storage of information in a plurality of bistable circuits including pairs of gaseous discharge devices 1520 and 1525, 1530 and 1535, 1540 and 1545, 1630 and 1635, and 1640 and 1645, respectively. The storage in these bistable circuits is such that the space tubes 1525, 1535, 1545, 1635 and 1645 are normally in a conductive condition representing a space signal, and the associated mark tubes 1520, 1530, 1540, 1630 and 1640 are selectively fired in response to sensing recorded pulses in the related channels on the magnetic tape 137 representing mark signals. As an example, assuming that a mark pulse is sensed by the transducing head 931, a positive pulse is coupled through a condenser 1521 to the control electrode of the mark tube 1520, which control electrode is provided with an enabling bias by a voltage divider connected between B+ and ground. The application of a positive pulse through the coupling condenser 1521 fires the tube 1520 so that a positive voltage drop is produced across a cathode resistor 1522. This positive voltage drop, together with the positive potential across a normally charged condenser 1523, elevates the cathode potential of the space tube 1525 so that conduction in the normally conductive space tube 1525 no longer can be maintained, and the tube 1525 is extinguished. When the tube 1525 is extinguished, the condenser 1523 charges to a voltage equal to the drop across the cathode resistor 1522 in the cathode circuit of the mark tube 1520. In a similar manner, and simultaneously with the operation of the first bistable circuit controlled by the transducing head 931, the remaining bit storage units are selectively transferred to marking conditions if pulses are sensed by the heads 932–935 on the related channels of the magnetic film 137.

At the end of each cycle of operation of the counting chain, all of the bistable circuits are restored to a spacing condition under the control of the stop tube 1516. Firing the tube 1516 couples a positive pulse through a capacitor 1641 to a plurality of blocking diodes associated with the control electrodes of the space tubes 1525, 1535, 1545, 1635 and 1645. These diodes are similar to a neon lamp 1646 associated with the control electrode of the space tube 1645. One side of all of the neon lamps is connected to ground through a resistor similar to a resistor 1647, and the other side of all of the neon lamps is connected to a positive potential provided by a voltage divider including a pair of resistances 1642 and 1643 connected between B+ and ground. Accordingly, when a positive pulse is coupled through the capacitor 1641, all of the neon lamps break down and conduct the pulse through a plurality of coupling condensers, similar to a coupling condenser 1648, connected to the control electrodes of the space tubes. Since the control electrodes of all of the space tubes are provided with a fixed enabling bias from related voltage dividers, these pulses render all of the space tubes 1525, 1535, 1545, 1635 and 1645 conductive. Rendering these tubes conductive provides positive potential drops across their cathode resistors which, together with the voltages across the cathode coupling condensers connected to conductive mark tubes, is sufficient to elevate the cathode potentials of the conductive ones of the mark tubes 1520, 1530, 1540, 1630 and 1640 to a point at which conduction no longer can be sustained. Accordingly, all of the conductive mark tubes in the transmitting commutator 214 are extinguished in response to firing the stop tube 1516 in the counting chain.

In a telegraph switching system of the type described in detail in the above identified Fisher et al. application, the item of information stored on the magnetic film 137 at the beginning of each message is a group of successive code combinations representing a letter shift, a figure shift and a character "F." This group of codes controls the data handling system 100 to divert the following message material received from the transmitting equipment 102 to a special storage means (not shown) provided in the system. Thus, the first item of information reproduced from the magnetic film 137 by the transmitter 138 is a letter shift code comprising mark pulses in all of the five channels of the magnetic tape 137. Accordingly, following the cycle of operation of the counting chain in which the motor magnet 910 is operated and released to sweep this code combination past the transducing heads 931–935, positive pulses are transmitted through the amplifier 920 to the control electrodes of all of the mark tubes 1520, 1530, 1540, 1630 and 1640, thereby rendering all of these tubes conductive and extinguishing all of the space tubes 1525, 1535, 1545, 1635 and 1645. Since a number of different figure shift plus character code combinations, such as figure shift "F," figure shift "G," and figure shift "H," are used for control functions, the transmitting commutator 214 includes a decoding circuit arrangement for detecting and storing either a letter shift or a figure shift condition and for detecting certain other character codes. This decoding circuit arrangement is of the general type shown and described in United States Patent Nos. 2,787,780 and 2,787,781. In general, the decoding circuit comprises series circuits of blocking diodes, such as neon lamps, connected between pulse sources and detector tubes for permitting the pulse sources to operate a selected one of the detector tubes only when a selected code combination is stored in the bistable circuits. To accomplish this, the blocking diodes in each series circuit are selectively connected to the cathode circuits of each of the bistable circuits to receive forward or reverse biasing potentials in accordance with the storage of a space or a mark condition in the related bistable circuit.

To decode or recognize the letter shift code now stored in the bistable circuits, the next firing of the start tube 1510 in the counting chain forwards a positive pulse over a condenser 1676 to the control electrode of a gaseous discharge prime tube 1675, the control electrode of which is provided with a fixed enabling bias by a voltage divider. The firing of the tube 1675 produces a negative-going pulse at the anode thereof which is coupled through a condenser 1679 to the anode of a normally conductive tube 1680, thereby extinguishing this tube. A positive potential drop is produced across a cathode resistor 1678 by firing the prime tube 1675, and this positive potential is supplied to a terminal 1677 which is connected to a plurality of terminals 1651, 1661, 1666, and 1671 to provide an enabling bias for a plurality of tubes 1650, 1655, 1660, 1665 and 1670.

Figure 3:
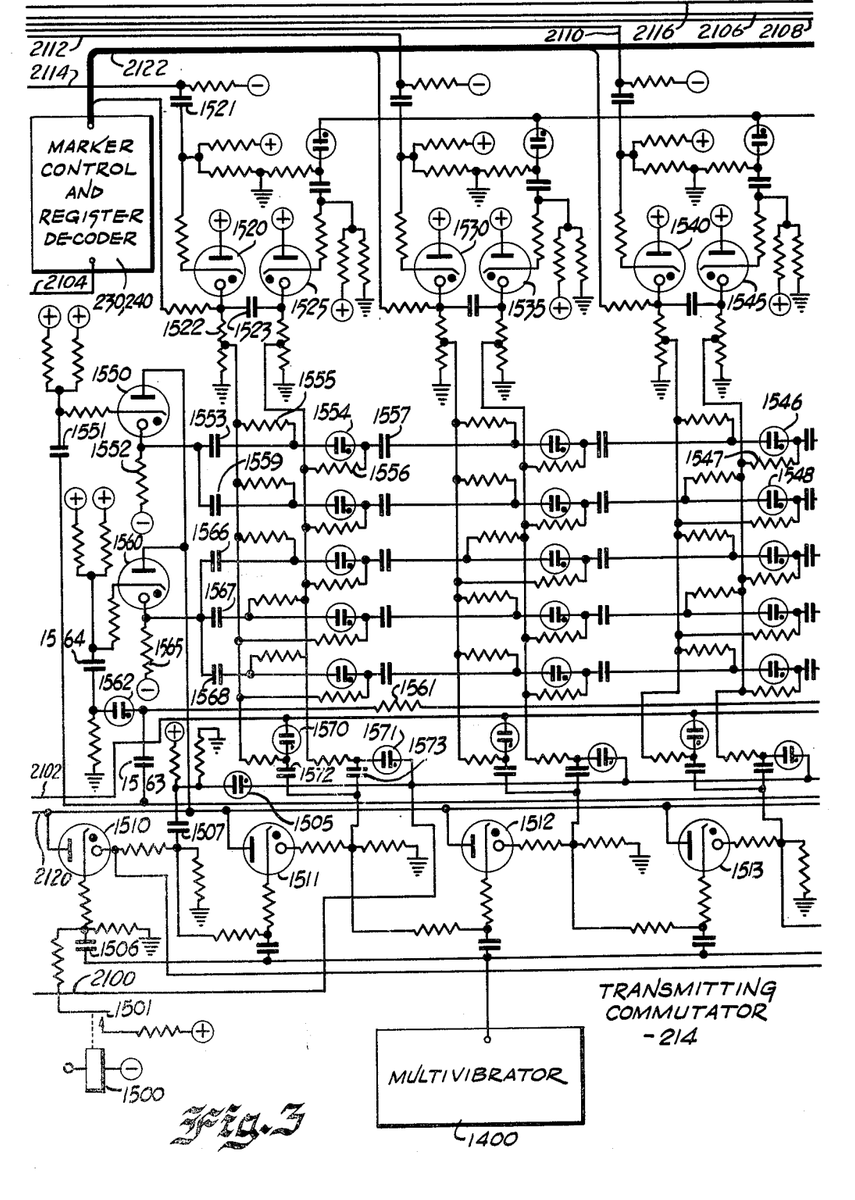
Figures 4, 5:
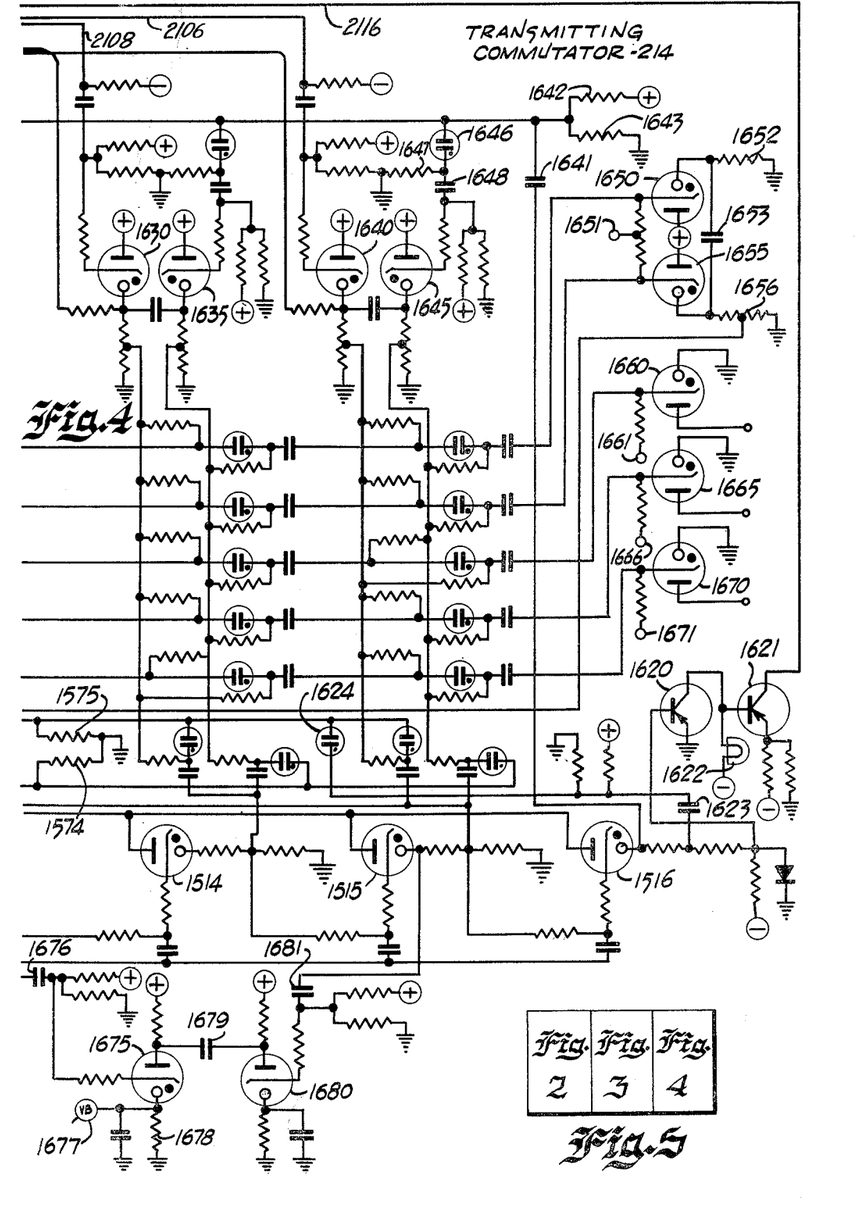

The sequential operation of the counting chain including tube tubes 1511, 1512, 1513, 1514 and 1515 continues, as described above, until the tube 1515 is rendered conductive to produce a positive-going pulse that is coupled through a condenser 1551 to the control electrode of a letter shift drive tube 1550, the control electrode of which is provided with a fixed enabling bias by a voltage divider. This pulse renders the tube 1550 conductive so that the positive-going pulse appearing across its cathode resistor 1552 is coupled through a condenser 1553 to a blocking diode 1554 comprising a neon lamp. The right hand terminal of the lamp 1554, as shown in FIG. 3, is connected to ground through a resistor 1556 and a portion of the cathode resistance of the nonconductive space tube 1525. The terminal of the neon lamp 1554 that is connected to the condenser 1553 is supplied with a positive potential from the cathode resistor 1522 of the conductive mark tube 1520 through a resistor 1555. The potential applied across the lamp 1554 due to the conductive condition of the mark tube 1520 is slightly below its ionizing potential so that positive pulse supplied through the condenser 1533 ionizes the neon lamp 1554 to couple the positive-going pulse to a condenser 1557.

In a similar manner, due to the conductive condition of the mark tube 1530, 1540, 1630 and 1640, a plurality of other blocking diodes, similar to the neon lamp 1554, are sequentially rendered conductive to transmit the positive-going pulse provided by firing the letter shift prime tube 1550 to the control electrode of the letter shift tube 1650, the control electrode of which is provided with an enabling bias from the terminal 1677 due to the conductive condition of the prime tube 1675. This pulse renders the tube 1650 conductive to provide a voltage drop across its cathode resistor 1652 which, when added to the voltage across a cathode coupling condenser 1653, is sufficient to extinguish the figure shift tube 1655. Accordingly, the transmission of the letter shift code to the transmitting commutator 214 causes the firing of the letter shift tube 1650 to store this information in the transmitting commutator 214.

Referring back to the firing of the tube 1515, which tube represents the last information bit in the transmitted combinational code, the firing of this tube also couples a positive pulse through a condenser 1681 to the control electrode of the tube 1680, the control electrode of which is provided with a fixed enabling bias by a voltage divider. This pulse fires the tube 1680 to produce a negative voltage swing which is coupled through the condenser 1679 to extinguish the prime tube 1675, thereby removing the positive enabling bias from the terminal 1677 and the control electrodes connected thereto. However, this does not change the conductive condition of the discharge device 1650.

The firing of the tube 1515 also provides an enabling bias for the stop tube 1516 so that this tube is fired in response to the transmission of the next pulse from the multivibrator 1400. Firing the stop tube 1516 operates the motor magnet 910 in the transmitter 138 to open the contacts 911 so that the tubes 1510–1516 are again extinguished and so that the drive tube 1550 is also extinguished. Firing the tube 1516 also resets the bistable circuits to space conditions. The extinguishing of the tube 1516 again releases the motor magnet 910 so that the next code combination stored on the magnetic film 137 is moved past the transducing heads 931–935 to transmit mark pulses representing the figure shift code combination to the control electrodes of only the tubes 1520, 1530, 1630 and 1640 so as to render these tubes conductive and to extinguish the tubes 1525, 1535, 1635 and 1645. Accordingly, the tubes 1520, 1530, 1545, 1630 and 1640 are now in conductive condition representing the figure shift code combination.

When the next cycle of operation of the counting chain in the transmitting commutator 214 is initiated following the storage of the figure shift code in the bistable circuits, the prime tube 1675 is again rendered conductive to provide an enabling potential for the control electrodes of the tubes 1650 and 1655, among others, and the tube 1680 is again extinguished. When the last code bit tube 1515 is again rendered conductive, a pulse is once again transmitted over the coupling condenser 1551 to fire the tube 1550. The positive-going pulse produced across the cathode resistor 1552 is simultaneously transmitted to the coupling condenser 1553 and also to a coupling condenser 1559. However, the pulse transmitted to the condenser 1553 is blocked at a neon lamp 1546 associated with the third bistable circuit including the tubes 1540 and 1545 inasmuch as the right hand terminal of the neon lamp 1546 is connected to a positive potential of the cathode resistor of the conductive space tube 1545. Thus, when the pulse transmitted through the condenser 1553 and the preceding neon lamps is applied to the neon lamp 1546, both electrodes of this lamp are at a positive potential, and the diode 1546 does not break down to transmit the pulse to the control electrode of the tube 1650.

However, the positive pulse supplied to the coupling condenser 1559 is transmitted through a series of neon lamps, including a lamp 1548, to the control electrodes of the figure shift tube 1655. The neon tube 1548, which is associated with the third bistable circuit including the tubes 1540 and 1545, has its right hand electrode connected to ground through the cathode resistance of the extinguished mark tube 1540 and its left hand electrode connected to a positive potential on the cathode resistor of the conductive space tube 1545. This biasing arrangement for the lamp 1548, as contrasted with that provided for the lamp 1546, permits it to ionize and pass the pulse from the condenser 1559 through the remaining neon lamps to the control electrode of the figure shift tube 1655, thereby rendering this tube conductive. The flow of current through a cathode resistor 1656 associated with the figure shift tube 1655 produces a positive potential which, when added to the positive potential across the cathode coupling condenser 1653, is sufficient to elevate the potential of the cathode of the letter shift tube 1650 to a point that this tube is extinguished. In addition, the firing of the tube 1655 provides a positive potential which is supplied through a series resistor 1561 to a blocking diode or neon lamp 1562 associated with the control electrode of a figure shift drive tube 1560, thereby providing an enabling potential for this tube.

The firing of the tube 1515 also extinguishes the prime tube 1675 to remove the switched bias from the tubes 1650, 1655, 1660, 1665 and 1670, fires the tube 1680, and resets the bistable circuits to space conditions, as described above. The completion of this cycle of operation of the counting chain also momentarily operates the motor magnet 910 in the transmitter 138 to extinguish the tubes in the counting chain and the drive tube 1550 and to advance the magnetic film 137 a single step during which the third code combination recorded on the film 137 is swept past the transducing heads 931–935 to transmit the code combination representing the character "F" to the bit storage units. The sensing of the character "F" transmits positive pulses to the control electrodes of the mark tubes 1520, 1540 and 1630 so that these tubes are rendered conductive and the corresponding space tubes 1525, 1545 and 1635 are extinguished. Accordingly, the tubes 1520, 1535, 1540, 1630 and 1645 are in a conductive condition at this time.

The transmission of the character "F" following the transmission of a figure shift code is utilized to control the transfer of the following message material to a special recorder (not shown). Therefore, when the counting chain initiates the cycle of operation immediately following the storage of the character "F" in the bistable circuits, the prime tube 1675 is again rendered conductive to provide a switched bias at the terminals 1651, 1661, 1666 and 1671. When the tube 1515 is fired in this cycle of operation of the counting chain, a positive pulse is again coupled through the condenser 1551 to the control electrode of the letter shift drive tube 1550, thereby rendering this tube conductive to transmit positive pulses to the condensers 1553 and 1559. However, these pulses produce no useful function inasmuch as the neon lamp gating circuits associated with these paths are not conditioned to transmit a pulse to the control electrodes of either of the tubes 1650 or 1655 inasmuch as neither a figure shift code nor a letter shift code has been stored in the bistable circuits.

The firing of the tube 1515 also transmits a positive pulse through a coupling condenser 1563 to the neon tube 1562. As set forth above, the right hand electrode of this blocking diode is connected to a positive potential through the resistor 1561, and the pulse supplied to the condenser 1563 is coupled through the diode 1562 and a coupling condenser 1564 to the control electrode of the figure shift drive tube 1560, the control electrode of which is provided with a fixed bias by a voltage divider. Firing the tube 1560 produces a positive-going pulse across a cathode resistor 1565 that is coupled through a condenser 1566 to a series circuit of neon lamps which are selectively strapped to the cathode resistors of the tubes in the binary pairs in accordance with the mark and space conditions forming the "F" code. Therefore, a pulse is transmitted through this circuit only when the tubes 1520, 1535, 1540, 1630 and 1645 are in a conductive condition to represent the combinational code for the character "F." This pulse is applied to the control electrode of a figure shift "F" control tube 1660, the control electrode of which is supplied with an enabling bias by the prime tube 1675, so as to fire the tube 1660. The operation of the tube 1660 indicates that a figure shift "F" code combination has been received by the transmitting commutator 214.

The counting chain in the transmitting commutator 214 thereupon completes its cycle of operation incident to which all of the space tubes in the binary pairs are placed in a conductive condition, the mark tubes in the binary pairs are extinguished, the prime tube 1675 is extinguished, and the motor magnet 910 in the transmitter 138 is momentarily rendered conductive so that the tubes 1550, 1560 and 1510–1516 are extinguished and the next code combination recorded on the magnetic tape 137, which comprises the first character in a message, is swept past the transducing heads 931–935 to be stored in the bistable circuits in the transmitting commutator 214.

The firing of the tube 1660 places a control circuit (not shown) of the type disclosed in the above identified Fisher et al. application in operation so that a magnetic recorder (not shown) is conditioned to receive the following message material reproduced from the magnetic film 137 by the transmitter 138. This control circuit extinguishes the tube 1660 and releases the start relay 1500 so that the contacts 1501 are opened to interrupt the operation of the counting chain in the transmitting commutator 214 with the first character of the message stored in the bistable circuits in the commutator 214. When the special recorder (not shown) has been conditioned to receive the information, the control circuit associated therewith reoperates the relay 1500 to close the contacts 1501 so that the transmitting commutator 214 is again conditioned for operation.

When the next pulse is supplied from the multivibrator 1400 to the control electrode of the start tube 1510, this tube is rendered conductive to perform the functions described above. In addition, the firing of the start tube 1510 transmits a space pulse to a flip-flop circuit that controls the applications of Baudot coded signals in serial form to the special recorder or through the switching equipment 218, 219 to the data receiver 104. When the tube 1510 is fired, a positive-going pulse is coupled through a condenser 1507 to a neon diode 1505. The terminal of the diode 1505 connected to the condenser 1507 is provided with a positive potential near its ionizing potential by a voltage divider, and its other terminal is connected to ground through a resistor 1574 so that the lamp 1505 is ionized by the pulse supplied by the condenser 1507. The ionization of the diode 1505 transmits a positive-going pulse over a space signal conductor to a condenser 1771 that is connected to the base electrode of a transistor 1770 in the output flip-flop circuit. The application of a positive pulse to the transistor 1770 operates the flip-flop circuit to transmit a space pulse representing a start signal.

When the next tube 1511 in the counting chain is rendered conductive, a space pulse or a mark pulse is transmitted to the flip-flop circuit in accordance with the marking or spacing condition stored in the first bit storage unit comprising the tubes 1520 and 1525. When the tube 1511 fires, a positive-going pulse is coupled to both of a pair of condensers 1572 and 1573. Assuming that the mark tube 1520 in the first bistable circuit is now conducting, a positive potential is supplied to one terminal of a neon lamp or gate 1570 through a resistor 1576, and the other terminal of this neon lamp is connected to ground through a resistor 1575. Accordingly, the application of a pulse to the condenser 1572 causes the neon lamp 1570 to pass this positive pulse so that it is transmitted through a coupling condenser 1761 to the base electrode of a transistor 1760 comprising the other of the pair of transistors forming the flip-flop circuit. Since the space tube 1525 in the first binary pair is extinguished due to the conductive condition of the mark tube 1520, both sides of a gate means comprising a neon tube 1571 are connected to ground, one side through the cathode resistor of the tube 1525 and the other side through the resistor 1574. Accordingly, the pulse transmitted through the coupling condenser 1573 is not further transmitted to the input of the transistor 1770. In a similar manner, the firing of each of the tubes 1512, 1513, 1514 and 1515 selectively couples a positive-going pulse either to the base electrode of the transistor 1760 or to the base electrode of the transistor 1770 through one of a pair of neon tube gates in accordance with the mark or space condition stored in the associated bit storage unit.

Following the firing of the tube 1515, the tube 1516 is fired to transmit a stop pulse to the transistor 1760 through a condenser 1623 and a neon lamp 1624 having a fixed enabling bias. The firing of the tube 1516 again momentarily energizes the motor magnet 910 in the transmitter 138 so that the next item of information stored on the magnetic film 137 is transmitted to the flip-flop circuit under the control of the counting chain and the bit storage units.

Referring now to the operation of the flip-flop circuit, this circuit selectively energizes a recording element in the special recorder or in the data receiver 104 under the control of the mark and space pulses received from the transmitting commutator 214. More specifically, when the start tube 1510 is rendered conductive, a positive pulse representing a space condition is supplied to the input of the flip-flop circuit. This pulse is transmitted through the coupling condenser 1771 to the base electrode of the transistor 1770. Assuming that the transistor 1770 is in a conductive condition at this time, the positive pulse supplied through the coupling condenser 1771 places the base electrode of the transistor 1770 at a potential that is positive with respect to the emitter electrode so that conduction in the transistor 1770 is terminated. The interruption of current flow in the collector circuit of the transistor 1770 reduces the potential drop across a resistor 1766 in a voltage divider that also includes a pair of resistances 1764 and 1765. This places a more negative potential on the base electrode of the transistor 1760 to render this transistor conductive. The flow of collector current in the transistor 1760 produces a positive potential drop across a resistor 1772, forming a portion of a voltage divider that also includes a pair of resistances 1773 and 1774, to maintain a more positive potential on the base electrode of the transistor 1770. This potential holds the transistor 1770 in a nonconductive condition following the dissipation of the triggering impulse supplied to the condenser 1771.

The termination of conduction through the transistor 1770 reduces the potential drop across an emitter resistor 1775 so that the potential supplied to the emitter electrode of a buffer transistor 1780 becomes more positive. Further, when the transistor 1760 is rendered conductive, the flow of emitter current in the transistor 1760 causes the base electrode of the buffer transistor 1780 to drop to a potential that is negative with respect to its emitter. Thus, the emitter electrode of the buffer transistor 1780 conducts to carry the combined collector and base currents of the transistor 1760 as well as the collector current of the transistor 1780. This current flow provides a negative potential drop across the resistor 1775 to aid in maintaining the transistor 1770 in a cutoff condition.

The flow of current through a collector resistor 1781 of the conducting buffer transistor 1780 provides a more positive potential on the base electrode of output drive transistor 1790 so that this transistor is cutoff, the emitter electrode thereof being provided with a small fixed negative bias by a voltage divider including a pair of resistances 1791 and 1792 connected between negative battery and ground. When the drive transistor 1790 is rendered nonconductive, current flow through a resistance element 1793 in the output signal line is interrupted to represent a space pulse or signal.

Assuming that a mark pulse is transmitted through the coupling condenser 1761 to the base electrode of the transistor 1760, this positive-going pulse renders the transistor 1760 nonconductive so that the voltage drop across the resistor 1772 is terminated. This provides a sufficiently negative bias on the base electrode of the transistor 1770 to place this transistor in a conductive state. The collector current flow through the conductive transistor 1770 provides a positive voltage drop across the resistor 1766 so that the transistor 1760 is maintained in a cutoff condition. The flow of emitter current in the transistor 1770 provides a negative potential across the emitter resistor 1775 which is supplied to the emitter electrode of the buffer transistor 1780. The application of a negative potential to this emitter electrode together with the termination of the conductive condition in the transistor 1760, which causes the base electrode of the transistor 1780 to go to substantially ground potential, renders the transistor 1780 nonconductive. The termination of collector current flow in the transistor 1780 provides a more negative potential at the base electrode of the output drive transistor 1790. The application of a more negative potential to this base electrode places the transistor 1790 in a conductive condition so that current flows through or a voltage drop is produced across the resistor 1793.

Thus, the transistors 1760 and 1770 provide a flip-flop circuit which has two stable conductive states and which is operated between the two stable states only in response to the application of a triggering pulse from the mark and space pulse conductors of the transmitting commutator 214. The transistors 1760 and 1770 control the conductive or nonconductive state of the output drive transistor 1790 so that mark and space pulse information is transmitted in serial form to either the special recorder or through the switching equipment 218, 219 to the data receiver 104.

As indicated above, the firing of the tube 1660 controls circuits for routing the coded data entries supplied at the output of the transistor 1790 to the special recorder. Accordingly, the transmitting commutator 214 and the transmitter 138 operate in the manner described above to relay the first portion of the message information stored on the magnetic film 137 to the special recorder. When the transmission of information to the special recorder is to be terminated, a figure shift "G" code combination is stored on the magnetic film 137. When this code combination is reproduced by the transmitter 138 and stored in the bistable circuits in the transmitting commutator 214, the commutator 214 detects this code combination and interrupts the transmission of information to the special recorder.

More specifically, in the cycle of operation following the storage of the figure shift code combination in the bit storage units in the transmitting commutator 214, the figure shift tube 1655 is rendered conductive, as described above, so that an enabling bias is provided at its cathode resistor 1656 for biasing the blocking diode 1562 to a point near its ionizing potential. Thereafter, the transmitting commutator 214 is cleared, and the transmitter 138 transmits a code combination representing the character "G" to the transmitting commutator 214 which is stored in the bistable circuits by rendering the mark tubes 1530, 1630 and 1640 conductive, the space tubes 1525 and 1545 remaining in a conductive condition.

In the cycle of operation of the counting chain following the storage of this information in the transmitting commutator 214, the tube 1515 is rendered conductive to transmit a pulse through the coupling condensers 1563 and 1564 and the blocking diode 1562 to the control electrode of the figure shift drive tube 1560. This renders this tube conductive so that a positive pulse is transmitted through a condenser 1567 and a plurality of series connected diode gates or neon lamps to the control electrode of the figure shift "G" control tube 1665. A pulse is transmitted only over this series circuit arrangement because the conductive tubes 1525, 1530, 1545, 1630 and 1640 enable all the diode gates in only this path. This positive pulse supplied to the coupling condenser 1566 from the cathode resistor 1565 of the tube 1560 is not transmitted to the control electrode of the figure shift "F" control tube 1660 inasmuch as all of the diode gates connected in series therewith are not properly biased for conduction.

The control tube 1665 is provided with an enabling bias at the terminal 1666 by the conductive prime tube 1675, and the tube 1675 is rendered conductive by the pulse from the decoding circuit to provide a control signal that renders the marker control and register decoder 230, 240 responsive to the following codes supplied by the commutator 214 and the transmitter 138. The firing of the tube 1665 also terminates the transfer of information from the drive transistor 1790 to the special recorder. Following the firing of the tube 1665, the counting chain in the transmitting commutator 214 completes its cycle of operation to perform the functions described above and, in momentarily operating the motor magnet 910, actuates the transmitter 138 to store the first of a series of codes representing the designation of the data receiver 104 that is to receive the following message material stored on the magnetic film 137. This first code or one digit thereof is now stored in the five bistable circuits in the transmitting commutator 214 and is supplied from the cathodes of the tubes 1520, 1530, 1540, 1630 and 1640 over a plurality of conductors to the marker control and register decoder 230, 240. The tube 1665 is extinguished and the start relay 1500 is released so that additional information is not reproduced by the transmitter 138.

The marker control and register decoder 230, 240 translates the first digit supplied by the tarnsmitting commutator 214 and then operates the start relay 1500 so that the next switching code is reproduced from the magnetic film 137 and transferred through the transmitting commutator 214 to the circuit 230, 240. The marker control and register decoder 230, 240 operates in this manner until all of the necessary switch directing information has been received and the switching equipment 218, 219 is operated to connect the output of the drive transistor 1790 to the correct data receiver 104. At this time, the marker control and register decoder 230, 240 is effectively disconnected from he transmitting commutator 214, and the start relay 1500 is again operated so that the message material stored on the magnetic film 137 is reproduced by the transmitter 138, stored in the transmitting commutator 214, and transmitted by the commutator 214 to the flip-flop circuit including the transistors 1760 and 1770. The mark and space information provided by the drive transistor 1790 controlled by the flip-flop circuit is transmitted through the switching equipment 218, 219 to the selected data receiver 104. In the event that the material previously stored in the special recorder is also to be transmitted to the selected data receiver 104, the figure shift "F" code combination is inserted in the message material and controls the transmitting commutator 214 in the manner described above so that the tube 1660 is rendered conductive. The firing of the tube 1660 at this time operates the related control circuit so that the information previously stored in the special recorder is transmitted to the selected data receiver 104.

A figure shift "H" combination is stored as the last entry on the magnetic film 137 to indicate the end of the message. When this information is reproduced from the magnetic film 137 and stored in the transmitting commutator 214, this commutator decodes the figure shift "H" combination to restore the transmitting commutator 214 to a normal condition. More specifically, the transmission of the figure shift code combination from the transmitter 138 to the commutator 214 fires the tube 1655, and the following storage of the "H" code combination in the bistable circuits in the transmitting commutator 214 places the tubes 1525, 1535, 1540, 1635 and 1640 in a conductive condition. When the counting chain in the transmitting commutator 214 advances through its next cycle of operation, the figure shift drive tube 1560 is fired to supply a positive pulse to a coupling condsenser 1568 and also to the coupling condensers 1566 and 1567. The pulses supplied to the condensers 1566 and 1567 perform no useful function inasmuch as transmission of these pulses to the control electrodes of the tubes 1660 and 1665 is blocked by the series arrangement of gates, at least some of which are not enabled diodes. However, the diodes connected in series with the coupling condenser 1568 are properly conditioned by the selective operation of the bit storage units, and a positive pulse is coupled to the control electrode of the tube 1670 to render this tube conductive. The firing of the tube 1670 restores the data handling system 100 including the transmitting commutator 214 to a normal condition in the manner described in detail in the Fisher et al. application.

Although the data handling system has been described in conjunction with the details of an automatic telegraph system, the circuits and operational techniques embodied therein are capable of general application. Accordingly, it should be understood that many other modifications and embodiments can be devised by those skilled in the art that will fall within the spirit and scope of the principles of this invention.

What is claimed as new and desired to be secured by Letters Patent of the United States is:

1. A data transmitting apparatus for use with plural bit code signals comprising a plurality of electronic means, means for operating said electronic means in accordance with the code bits of a signal to be transmitted, a pair of signal conductors, a pair of gate circuits connecting each of said electronic means to both of said conductors, and pulse generating means for selectively supplying signals representing the code bits stored in said electronic means to one or the other of said pair of conductors through a selected one of each of said pairs of gate circuits.

2. A data transmitting apparatus for use with plural bit code signals comprising a plurality of pairs of electronic means, means for selectively rendering one electronic means in each of said pairs of electronic means conductive in accordance with the bits of a code signal to be transmitted, a pair of signal conductors, individual first gate circuits separately controlled by a given one of said electronic means in each of said pairs of electronic means and connected to one of said conductors, individual second gate circuits separately controlled by the other one of the electronic means in each of said pairs of electronic means and connected to the other of said conductors, and means for supplying signals to said first and second gate circuits to provide signals on said conductors in accordance with the bits of the code signal to be transmitted.

3. The apparatus set forth in claim 2 including a switching circuit having two stable states connected to said two signal conductors for supplying output signals to a single signaling line in accordance with the signals applied to said two signal conductors.

4. The apparatus set forth in claim 2 in which the said means for supplying signals includes a counting means having a plurality of separate elements each separately connected to the individual first and second gate circuits associated with each separate one of said pairs of electronic means.

5. A data transmitting apparatus controlled by a magnetic member adapted to store plural bit code signals comprising a plurality of pairs of discharge devices connected as switches having two stable states, a plurality of transducing heads disposed adjacent said member and individually connected to one of the discharge devices in each of said pairs to operate said pairs of discharge devices to stable states in accordance with the bits of a code signal to be transmitted, a gate circuit individual to each of said pairs and controlled thereby, output signaling means connected to all of said gate circuits, a counting means connected to said gate circuits, means for operating said counting means through a fixed cycle for selectively supplying signals to said output signaling means under the control of said gate circuits and in accordance with the code signal to be transmitted, and means operated under the control of said counting means for periodically advancing said member to supply code signals to be transmitted to said pairs of discharge devices.

6. The data transmitting apparatus set forth in claim 5 including means operated by said counting means for operating all of said pairs to a predetermined one of said stable states incident to each of said fixed cycles of operation.

7. The data transmitting apparatus set forth in claim 5 including means in said counting means for supplying predetermined signals to said output signaling means incident to each of said fixed cycles of operation.

8. A data transmitting system comprising a plurality of controlled conduction devices selectively operable to provide a pattern of conductive conditions representing the bits of plural bit code signal, a counting means operable through a fixed cycle, means including said plurality of controlled conduction devices and said counting means for supplying output signals in accordance with said bits, control means, a decoding network connecting said plurality of controlled conduction devices to said control means, and means controlled by said counting means for supplying an operating signal to said decoding network incident to each cycle of operation of said counting means to operate said control means only when said plurality of controlled conduction devices provide a predetermined pattern.

9. A data handling system for use with a sensible medium adapted to store plural bit code signals comprising a plurality of switch pairs of electronic devices having two stable states, means including means for advancing said medium for transmitting code signals to said switch pairs to establish different patterns of stable states in accordance with the bits of said code signals, counting means operable through successive cycles of operation, signaling means connected to said switch pairs and including said counting means for supplying output signals in accordance with code signals, decoding means connected to said switch pairs, control means connected to said decoding means, and means controlled by said counting means for operating said decoding means incident to each of said cycles of operation, said control means being actuated by said decoding means when a predetermined pattern is provided in said switch pairs.

10. The system set forth in claim 9 in which said decoding means includes a plurality of gate circuits connected to and controlled by said switch pairs and in which said means for operating said decoding means includes a controlled conduction device controlled by said counting means.

11. In a data handling system, a plurality of controlled conduction devices selectively operable to different patterns of conductive and nonconductive conditions in accordance with the bits of a plural bit code, a plurality of gate circuits connected to each of said devices, a plurality of control means, circuit means connecting different groups of said gate circuits in series and to different ones of said control means, each of said groups including one gate circuit connected to each of said devices, and signaling means for simultaneously supplying signals to all of said different groups of connected gate circuits to operate a selected one of said control means in accordance with the pattern provided by said controlled conduction devices.

12. The system set forth in claim 11 in which said signaling means includes timing means for supplying said signals at periodic intervals.

13. In a data handling system, a plurality of controlled conduction devices selectively operable to different patterns of conductive and nonconductive conditions in accordance with the bits of plural bit code, a plurality of gate circuits connected to and controlled by each of said devices, first control means, first circuit means connecting one of the gate circuits connected to each of said devices to said first control means, second control means, second circuit means connecting another of the gate circuits connected to each of said devices to said second control means, first signaling means for supplying a signal to said first circuit means to operate said first control means only when said devices provide a predetermined pattern, and second signaling means controlled by said first control means for supplying a signal to said second circuit means for operating said second control means.

14. The system set forth in claim 13 in which said first and second signaling means include a counting means for supplying said signals to said first and second circuit means at time spaced intervals.

15. A data transmitting apparatus comprising a plurality of pairs of discharge tubes, means connecting each of said pairs of tubes to form a switch pair having two stable states in which only one or the other of the tubes is conductive, means for selectively operating said pairs of discharge tubes to selected patterns of stable states in accordance with the bits of a plural bit code signal, a mark signal conductor, a space signal conductor, a first plurality of gate circuits each connecting one of said tubes in said pairs to the mark conductor, a second plurality of gate circuits each connecting the other tube in said pairs to the space conductor, a counting chain including a plurality of discharge devices each individually connected to the two gate circuits individually connected to each of the pairs of discharge tubes, and means for operating said counting chain to sequentially fire the discharge devices therein so that a pulse is transmitted to one of said mark and space conductors as each of said discharge devices is fired under the control of the two gate circuits connected to the fired discharge device and in accordance with the stable state of the pair of tubes connected to these two gate circuits.

16. A data transmitting apparatus comprising a plurality of controlled conduction devices selectively operable to patterns of conductive and nonconductive conditions in accordance with the bits of plural bit code, a first plurality of gate circuits each connected to and controlled by one of said devices, a signaling channel connected to said gate circuits, a counting chain including a controlled conduction means coupled to each of said first plurality of gate circuits, means for operating said counting chain through a cycle of operation so that each of the controlled conduction means in said chain supplies a signal to each of said first plurality of gate circuits, said gate circuits controlling the selective application of signals to said signaling channel in accordance with the pattern provided by said plurality of controlled conductive devices, a second plurality of gate circuits each connected to and controlled by one of said plurality of controlled conduction devices, a control means, means connecting said second plurality of gate circuits to said control means, and means for supplying a signal to said second plurality of gate circuits to operate said control means only when said plurality of controlled conduction devices provides a predetermined pattern.

17. A data transmitting apparatus comprising a plurality of pairs of controlled conduction devices, means connecting each of said pairs of devices to form a bistable circuit having two stable states in which only one or the other of the devices is conductive, means for selectively operating said bistable circuits to selected patterns of stable states in accordance with the bits of a plural bit code, a mark signal conductor, a space signal conductor, a plurality of first gate circuits each connecting one of the devices in one of said bistable circuits to the mark conductor, a second plurality of gate circuits each connecting the other device in one of said bistable circuits to the space conductor, a counting means including a plurality of controlled conduction means each individually connected to the two gate circuits connected to each of the bistable circuits, means for operating said counting means to sequentially operate the controlled conduction means therein so that a pulse is transmitted to one of said mark and space conductors as each of said controlled conduction means is operated under the control of the two gate circuits connected to the operated controlled conduction means and in accordance with the stable state of the bistable circuit connected to these two gate circuits, a plurality of third gate circuits each connected to and selectively controlled by one of said bistable circuits, control means, circuit means connecting said third gate circuits to said control means, and means controlled by said counting means for applying a signal to said circuit means to operate said control means only when a predetermined pattern is provided by said bistable circuits.

References Cited in the file of this patent

UNITED STATES PATENTS

| | | |
|---|---|---|
| 2,906,999 | Wright | Sept. 29, 1959 |
| 2,948,882 | Fisher | Aug. 9, 1960 |
| 2,976,347 | Fisher et al. | Mar. 21, 1961 |